No. 705,654. Patented July 29, 1902.
B. DJUP.
ROLLING PIN.
(Application filed Mar. 13, 1902.)
(No Model.)

WITNESSES:
D. E. Carlsen.
J. E. Carlson.

INVENTOR:
Bertha Djup
BY her ATTORNEY:
A. M. Carlsen.

UNITED STATES PATENT OFFICE.

BERTHA DJUP, OF STAMBAUGH, MICHIGAN.

ROLLING-PIN.

SPECIFICATION forming part of Letters Patent No. 705,654, dated July 29, 1902.

Application filed March 13, 1902. Serial No. 97,979. (No model.)

*To all whom it may concern:*

Be it known that I, BERTHA DJUP, a citizen of the United States, residing at Stambaugh, in the county of Iron and State of Michigan, have invented certain new and useful Improvements in Rolling-Pins; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rolling-pins; and the object of my invention is to combine with a rolling-pin a flour-sieve, a biscuit-cutter, and a doughnut-cutter. This object I attain by the novel construction and arrangement of parts illustrated in the accompanying drawings, in which—

Figure 1:
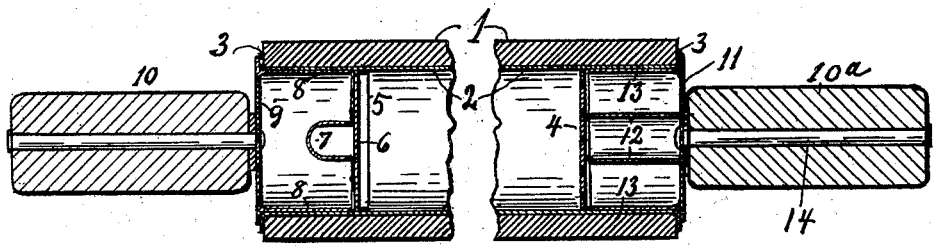
Figure 2:
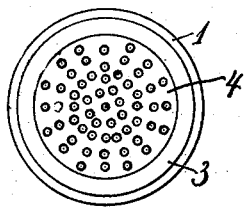
Figure 3:
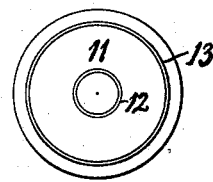

Figure 1 is a longitudinal central sectional view of my complete device. Fig. 2 is a right-hand end view of Fig. 1 with the doughnut-cutter removed. Fig. 3 is a face view of the doughnut-cutter alone.

Referring to the drawings by reference-numerals, 1 designates the rolling-pin proper. It consists of a cylindrical hollow piece of wood, in which is secured tightly a sheet-metal lining 2, preferably made of tin and having its end edges 3 turned outward upon the ends of the wooden tube 1.

Some distance from one end of the pin is secured a sieve 4, and near the other end is secured a ring 5, against the outer edge of which rests the round cover 6, having a catch or handle 7 by which to pull it out when the rolling-pin is to be filled with flour. This cover is partly held in place by the cylindrical body 8 which together with the cover 9 and rolling-handle 10 form a handy biscuit-cutter, which is held by frictional contact in the tube 2. The opposite handle $10^a$ of the rolling-pin serves also as a handle for the doughnut-cutter, formed of the cover 11 and the small cylindrical tube 12 and the larger tube 13, both secured to the cover 11. The larger tube 13 fits very snugly in the tube 2, so as to be held by frictional contact therein against accidental removal.

The handles 10 and $10^a$ are preferably made of wood and turn freely on the pintles 14, secured in the covers 9 and 11.

In the operation of the device the flour is filled into the rolling-pin by removing the biscuit-cutter and the cutter 6, and when it is desired to take some flour out the doughnut-cutter is removed and flour sifted out through the sieve 4 by any suitable movement of the rolling-pin.

Having thus described my invention, what I claim, and desire to secure by Letters Patent, is—

1. In a rolling-pin the combination with a hollow cylindrical body, of the internal removable cover 6 securable some distance inside the end of the roller, a sieve 4 secured some distance in from the other end of the roller, and two handles 10 and $10^a$ having each a cylindrical portion adapted to be inserted and friction-held in the ends of the cylindrical body outside of said sieve and cover 6.

2. In a rolling-pin the combination with a hollow cylindrical body, of the internal removable cover 6 securable some distance inside the end of the roller a sieve 4 secured some distance in from the other end of the roller and two handles 10 and $10^a$, having each a cylindrical portion adapted to be inserted and friction-held in the ends of the cylindrical body outside of said sieve and cover 6, said cylindrical portions of the handles being formed one into a doughnut-cutter and the other into a biscuit-cutter.

In testimony whereof I affix my signature in presence of two witnesses.

BERTHA DJUP.

Witnesses:
 CONRAD WEIGAND,
 P. O'BRIEN.